United States Patent [19]

Copley

[11] E Patent Number: Re. 32,185

[45] Reissued Date of Patent: Jun. 17, 1986

[54] SELF-CLEANING PULSED AIR CLEANER

[75] Inventor: George A. Copley, Farmington, Minn.

[73] Assignee: Donaldson Company, Inc., Minneapolis, Minn.

[21] Appl. No.: 683,406

[22] Filed: Dec. 19, 1984

Related U.S. Patent Documents

Reissue of:

[64] Patent No.: 4,364,751
Issued: Dec. 21, 1982
Appl. No.: 338,308
Filed: Jan. 11, 1982

U.S. Applications:

[62] Division of Ser. No. 195.873, Oct. 10, 1980, Pat. No. 4,331,459.

[51] Int. Cl.[4] ..... B01D 46/04

[52] U.S. Cl. ..... 55/96; 55/302

[58] Field of Search ..... 55/96, 97, 302, 272, 55/273

[56] References Cited

U.S. PATENT DOCUMENTS

| | | |
|---|---|---|
| 3,325,979 | 6/1967 | Smith . |
| 3,377,783 | 4/1968 | Young . |
| 3,402,531 | 9/1968 | Farr . |
| 3,421,295 | 1/1969 | Swift et al. . |
| 3,487,625 | 1/1970 | Lucas . |
| 3,509,698 | 5/1970 | Medcalf et al. . |
| 3,541,764 | 11/1970 | Astrom . |
| 3,837,150 | 9/1974 | Kubiak . |
| 4,129,429 | 12/1978 | Humbert, Jr. et al. . |
| 4,171,963 | 10/1979 | Schuler . |
| 4,174,204 | 11/1979 | Chase . |
| 4,187,091 | 2/1980 | Durre et al. . |
| 4,218,227 | 8/1980 | Frey . |
| 4,225,328 | 9/1980 | Stiehl . |
| 4,227,903 | 10/1980 | Gustavsson et al. . |
| 4,272,262 | 6/1981 | Britt et al. . |
| 4,331,459 | 5/1982 | Copley . |
| 4,359,330 | 11/1982 | Copley . |
| 4,364,751 | 12/1982 | Copley . |

FOREIGN PATENT DOCUMENTS

| | | |
|---|---|---|
| 248453 | 12/1963 | Australia . |
| 447061 | 3/1948 | Canada . |
| 17590 | 10/1980 | European Pat. Off. . |
| 2550918 | 5/1977 | Fed. Rep. of Germany . |
| 2730925 | 1/1979 | Fed. Rep. of Germany . |
| 1563990 | 3/1969 | France . |
| 2009625 | 2/1970 | France . |
| 2401690 | 3/1979 | France . |
| 1016556 | 1/1966 | United Kingdom . |

OTHER PUBLICATIONS

"Slim Vee Pac-2, Non-Stop Protection for Locomotive Engines", Bulletin 1200-239, Publication 10 M 874 FP, Copyright 1974 by Donaldson Company, Inc. (6 pages).

"Donaldson Gas Turbine Product News: Slim Vee Pac High-Efficiency Barrier Filter", Bulletin 3000-9, Publication 1 M 275 FP, Copyright 1974 by Donaldson Company, Inc. (2 pages).

"Pulse Clean: Air Filter for Turbine Intake Applications", Publication EC-1-115B-OCT-03, by American Air Filter Co., Inc. (6 pages).

*Primary Examiner*—Bernard Nozick

*Attorney, Agent, or Firm*—Merchant, Gould, Smith, Edell, Welter & Schmidt

[57] ABSTRACT

An air cleaning method and apparatus in which air to be cleaned is drawn toward and through a filter (44, 45) along a normal path having a first component extending from a first to a second end of the filter, so as to initially collect particulate matter on the filter, in which momentary pulses of clean air are directed through the filter in a direction opposed to the normal path, to interrupt flow of the air in the normal path so as to dislodge collected particles from the filter and enable migration of the particles toward the second end of the filter, and in which the migrated particles are withdrawn, in a portion of the air, from a site (33, 115) near the second end of the filter.

4 Claims, 6 Drawing Figures

FIG. 2
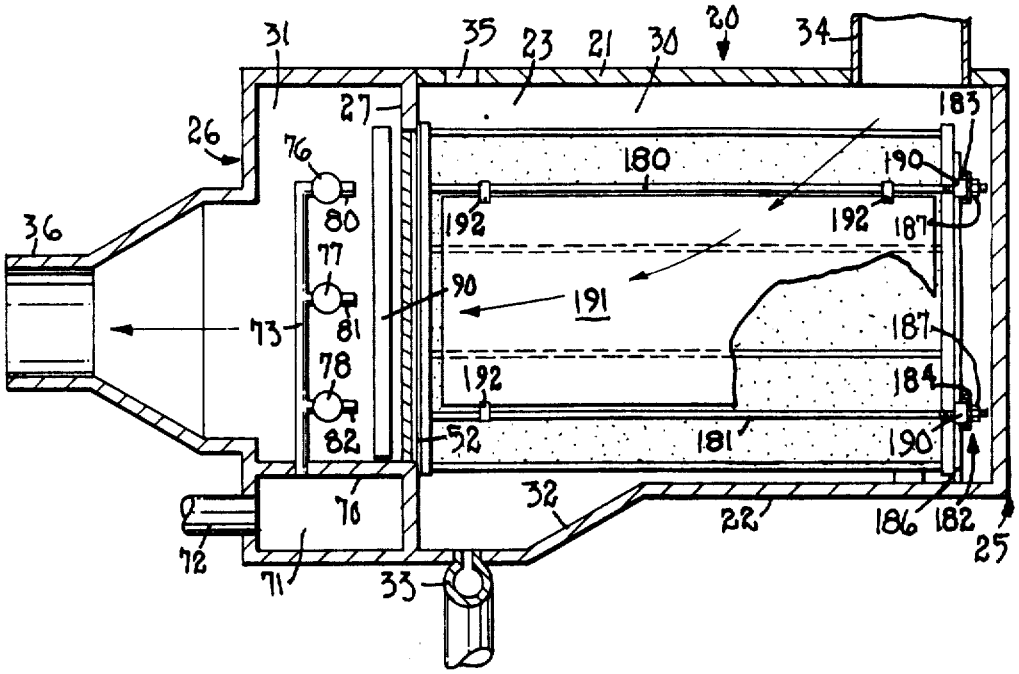
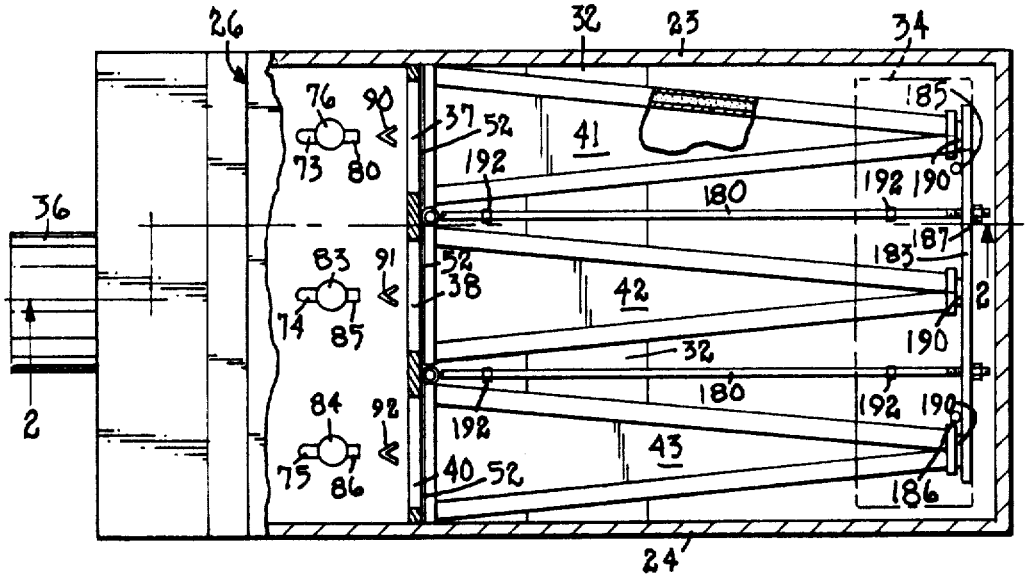
FIG. 1

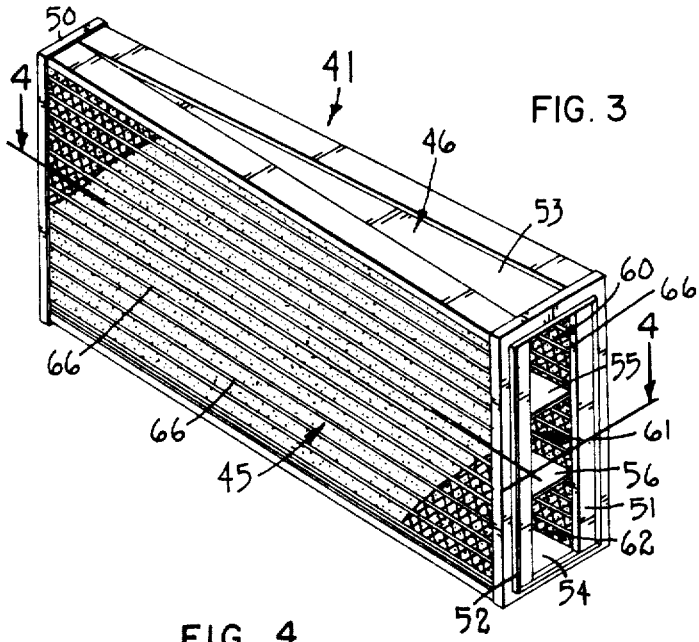
FIG. 3
FIG. 4
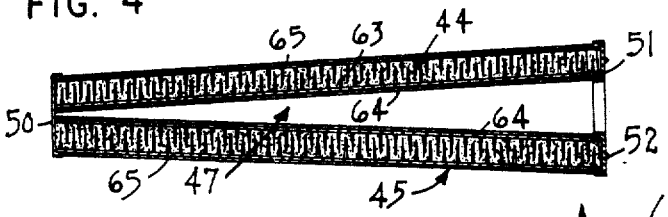
FIG. 5
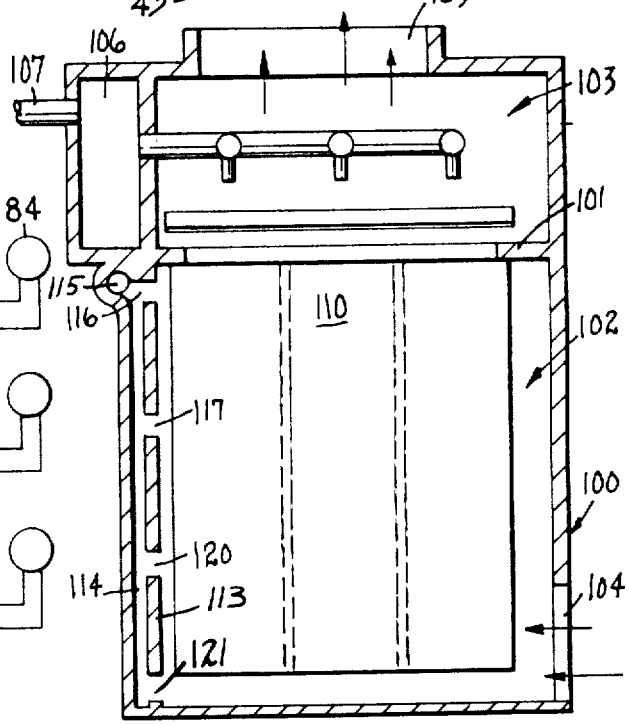
FIG. 6
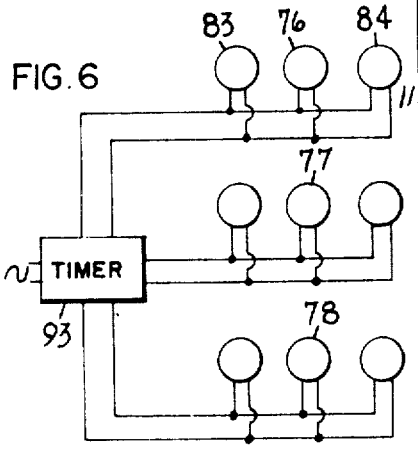

SELF-CLEANING PULSED AIR CLEANER

Matter enclosed in heavy brackets [ ] appears in the original patent but forms no part of this reissue specification; matter printed in italics indicates the additions made by reissue.

CROSS REFERENCE

This patent application is a Divisional application of U.S. Ser. No. 195,873, filed Oct. 10, 1980, and entitled 'Self-Cleaning Pulsed Air Cleaner' now U.S. Pat. No. 4,331,459, of which there is a copending Continuation-in-part application, U.S. Ser. No. 242,999 filed Mar. 12, 1981 for 'Self-Cleaning Pulsed Air Cleaner'.

TECHNICAL FIELD

This invention relates to the field of air cleaning by removal of particulate matter such as dust, particularly in installations requiring treatment of large volumes of air. The removal of dust is accomplished by passing the air through a filter of material permeable to flow of gas but not to passage of particulate matter, which collects on the filter thus gradually filling its pores and increasing the restriction of the cleaner, that is, the pressure drop across the filter and the load on the air-moving fan or blower. A successful air cleaner must accordingly have a large enough area of filter medium to reduce the initial restriction to an acceptable level, and must be either cleaned or replaced at sufficiently frequent intervals to prevent dirt buildup to a point where the restriction is adversely affective.

Means have been devised for cleaning filters, even without interrupting system operation, by mechanical shaking or by reverse air jet pulsing. The latter cleaning procedure is successful, when the filter medium is pleated paper, in releasing the particulate matter from the medium, but the resumption of normal airflow through the filter at the end of each pulse in large measure draws the particles back against the filter medium, thus greatly reducing the cleaning efficiency. This is particularly noticeable in installations which because of the large volume of air to be treated require large areas of filter medium.

BRIEF SUMMARY OF THE INVENTION

The present invention comprises an air cleaner with pulse jet cleaning in which the filter medium is positioned and the gas flow is directed so that particulate matter initially impinging on the filter medium is enabled and impelled to "migrate" across the medium during successive cleaning pulses and to ultimately reach a scavenge site where it can be discharged from the cleaner, always without interruption of the cleaning operation.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, wherein like reference numerals refer to like elements throughout the several views, FIG. 1 is a plan view of an air cleaner according to the invention, parts being broken away;

FIG. 2 is a view generally in vertical section looking along the line 2—2 of FIG. 1; FIG. 3 is a view in perspective of a filter assembly used in the air cleaner of FIGS. 1 and 2;

FIG. 4 is a view in horizontal section looking along the line 4—4 of FIG. 3;

FIG. 5 is a somewhat schematic view in section of a second embodiment of the invention; and FIG. 6 is a schematic wiring diagram.

DETAILED DESCRIPTION OF THE INVENTION

The embodiment of the invention shown in FIGS. 1 and 2 comprises an airtight housing 20 having a removable or hinged top 21, a bottom 22, opposite sides 23 and 24, opposite ends 25 and 26, and a vertical partition 27 which divides the housing into a larger chamber 30 and a smaller chamber 31. Bottom 22 is configured to provide a scavenge chamber 32 to which there is connected a scavenge duct 33. An inlet 34 for air to be cleaned is provided in top 21 near end 25, which is closed, and a draft opening 35 may be provided in top 21 opening into chamber 30 near partition 27. An outlet 36 for cleaned air is formed in end 26. Partition 27 is provided with a plurality of apertures 37, 38, 40 so that a path for air flow extends from inlet 34 through chamber 30, apertures 37, 38 and 40, and chamber 31 to outlet 36, as suggested by the arrows in FIG. 2.

A plurality of filter assemblies 41, 42 and 43 are mounted on partition 27 to close openings 37, 38, and 40. To accomplish this an upper rod 180 and a lower rod 181 are secured at first ends to partition 27, between filters 41 and 42, and a second pair of rods are similarly secured between filters 42 and 43. A clamping frame 182 comprising upper and lower horizontal channels 183 and 184 and vertical legs 185 and 186 is secured to the rods by nuts 187. Pressure pads 190 are provided between the channels and the filters. Legs 185 and 186 are extended downward to rest on bottom 22. Deflectors 191 of sheet metal are secured to extend vertically between the rods by clips 192, for a purpose presently to be described.

The filter assemblies are alike, and assembly 41 is shown in FIGS. 3 and 4 to comprise first and second flat filters 44 and 45 mounted on edge in a frame 46 with a tapering space 47 between them to converge toward a first, closed end 50 of the frame. The opposite end 51 of the frame is open, and is dimensioned to be seated against one of the openings in partition 27 and be sealed with respect thereto by a suitable gasket 52. A top 53 and bottom 54 of frame 46 are closed, and a pair of horizontal partitions 55 and 56 provide strength and rigidity to the assembly, and divide the tapering space 47 between the filters into an upper chamber 60, a middle chamber 61, and a lower chamber 62.

Each of filters 44 and 45 is made up of a body of pleated paper filter medium 63, contained between inner and outer sheets 64 and 65 of perforated metal or similar material, the whole being unified by stripes 66 of plastic or cement. The pleats of the filter medium run vertically, as is shown.

It will be apparent that assemblies 41, 42, and 43 divide chamber 30 into first and second portions of irregular outline, the first portion being that space outside of the filter assemblies, and the latter portion being the sum of the tapering spaces inside the filter assemblies.

Turning again to FIGS. 1 and 2, a horizontal partition 70 is provided in chamber 31, so that the space 71 below the partition comprises a reservoir for air for cleaning the filter, which air is supplied through a duct 72. A number of standpipes 73, 74, 75 equal to the number of filter assemblies extend upwardly from partition 70, each supplying air from the chamber to a number of valves equal to the number of chambers in the tapered space 47 of a filter assembly. Thus standpipe 73 is connected to and supports an upper valve 76, a center valve 77, and a lower valve 78. The valves connect with nozzles 80, 81, and 82 respectively, and are positioned so that the nozzles are directed centrally into chambers 60, 61, and 62 of the apposed filter assembly 42. Standpipes 74 and 75 are similarly equipped with valves and nozzles, of which valves 83 and 84 and nozzles 85 and 86 are shown in FIG. 2.

Between the nozzles and partition 27 are mounted a set of diffusers 90, 91, and 92, aligned with standpipes 73, 74, and 75 respectively. The partitioning of the filter assemblies into vertically arranged chambers, the provision of plural nozzles, one for each chamber, and the interposition of diffusers between the nozzles and the chambers has been found to optimize the efficiency of pulse jets in releasing particulate matter from the filters, as will be explained below.

Preferably valves 75, 76, etc. are normally closed, solenoid valves actuated electrically at brief intervals to emit pulses of air through the associated nozzles 80, 81, etc.

By a suitable switching circuit suggested in FIG. 6 and including a timer 93 the valves are energized so that jets are directed simultaneously into the upper chambers of the filter assemblies, then into the center chambers, and then into the bottom chambers, in a repeating cycle: the length of the cycle and the lengths of the pulses within the cycle and their spacing may be varied at the will of the operator, to maximize the cleaning effect in dependence on the nature of the particulate matter being removed.

Operation

In operation top 20 is opened and a plurality of clean filter assemblies 41, 42, and 43 are inserted and secured in sealed relation to partition 27. Top 21 is closed, an inlet duct for air to be cleaned is connected at 34, an outlet duct for clean air is connected at 36, a source of air under negative pressure is connected to duct 33, and a source of air under positive pressure is connected to duct 72. To set the cleaner in operation, electrical energy is supplied to timer 93, and airflow through the cleaner is started, ordinarily by a pump or fan connected to outlet 36.

Particles of dirt carried by the air entering the cleaner at 34 are initially collected on the outer surfaces of the filters in assemblies 41, 42, and 43. Timer 93 operates to supply a pulse of air from reservoir 71 through standpipes 73, 74, and 75 and valves 83, 76, and 84 to upper nozzles 85, 80, and 86, which project jets of air past diffusers 90, 91, and 92 into the upper chambers 60 of the filter assemblies, interrupting the flow of air inwards through the filters and momentarily discharging dirt particles from the outer surfaces of the filters. Deflectors 191 are provided to prevent particles expelled from one of the filters from being forcibly jetted across the space between filters to impinge on the adjacent filter. The particles start to descend by gravity into the normal airflow below, but upon termination of the cleaning pulses normal air flow is resumed and the particles are again brought into contact with the filters, at sites lower and nearer to partition 27 than initially. Pulses of air are then supplied in sequence to the center and the lower chambers of the filter assemblies, again dislodging particles of dirt and enabling them to move. The downward movement of particles near partition 27 is facilitated if a small quantity of ambient air is admitted at draft opening 35. The dust particles partake of a motion of migration across the surfaces of the filters and ultimately reach scavenge opening 32, from which they are extracted by duct 33, together with a small quantity of the air entering at 34 and 35.

In one embodiment of the invention the volume of chamber 71 was one cubic foot, cleaning air was supplied at 100 pounds per square inch, and the pressure dropped to 65 pounds per square inch during the pulses. These dimensions will naturally vary with the size of the installation: the one referred to had a capacity of 8,000 cubic feet per minute of air at inlet 34.

Structure of the Second Embodiment

A second embodiment of the invention is shown somewhat schematically in FIG. 6 to comprise a housing 100 divided by a partition 101 into a lower, larger chamber 102 and an upper, smaller chamber 103. Air to be cleaned is admitted to the housing at an inlet 104 near the bottom, and cleaned air is taken from the cleaner at an outlet 105, in its top. A reservoir 106 is supplied with air for the cleaning function by a duct 107, and standpipes, valves, nozzles, and deflectors may be supplied as described above. Filter assemblies such as assembly 110 are supported on and sealed to partition 101, and may be as shown in FIGS. 3 and 4.

Housing 100 is provided with a vertical partition 113 to define a scavenge plenum 114, connected to a scavenge duct 115, and a plurality of apertures 116, 117, 120, and 121 provide communication between chamber 102 and plenum 114.

Operation

The operation of the second embodiment of the invention is as decribed earlier. Particles of dust initially collecting on the surfaces of the filters, are momentarily released by the cleaning jets, and migrate across the filter surfaces. In this embodiment upward movement is caused by the normal flow of the air into the housing, and movement to the left is caused by the negative pressure maintained in scavenge plenum 114. The drawing shows that no draft opening is provided in this housing, so the cleaner can be used in a system where air is forced into inlet 104 rather than being drawn from outlet 105. In both of the embodiments the matter removed in the scavenge duct is disposed of in conventional fashion.

From the above it will be evident that I have invented an air cleaner in which particulate matter initially collected on a filter surface is enabled and caused to migrate across the filter surface to a scavenging location, as a result of operation of cleaning pulses, from which location it may be removed. Operation of the system for indefinite periods without interruption for removal of collected dirt is accordingly enabled.

Numerous characteristics and advantages of my invention have been set forth in the foregoing description together with details of the structure and function of the invention, and the noval features thereof are pointed out in the appended claims. The disclosure, however is illustrative only, and changes may be made in detail, especially in matters of shape, size, and arrangement of parts, within the principle of the invention, to the full extent indicated by the broad general meaning of the terms in which the appended claims are expressed.

What is claimed is:

1. The method of removing particles of solid matter from air which comprises:

(a) supplying a stream of uncleaned air to one end of a filter having adjacent sections defining chambers with a motion having a generally horizontal component parallel to the surface of the filter, so that the particles are initially collected on a surface of said filter and the air passes through the filter;

(b) repeatedly and sequentially supplying a reverse air pulsed to each of the chambers in a sequence from the uppermost section to the lowermost section dislodging the particles briefly from the surface of each filter section to enable them to migrate therealong toward the adjacent section and downstream toward a scavenge outlet located toward the remaining end of the filter; and (c) withdrawing at said scavenge outlet said air carrying the migrated particles.

2. A cleaner for removing particulate matter from air comprising, in combination:

(a) a housing having first and second spaced opposite ends;

(b) at least one filter assembly in said housing extending between said ends, said filter assembly comprising filter means permeable to air but not permeable to particulate matter, and including filter means having an opening interior space defined therein, said space extending toward said second end of said housing; and vertically spaced generally horizontal partitions dividing said space into plurality of vertically spaced chambers;

(c) means mounting said filter means in said housing so as to divide said housing into a first portion on one side of said filter assembly and a second portion on an opposite side of said filter assembly;

(d) means providing a path for a stream of air through said filter assembly, including:

(i) inlet means in said housing near said first end thereof for admitting raw air to said first portion of said housing, and (ii) outlet means near said second end of said housing for enabling egress of clean air from said second portion of said housing, so that particulate airborne matter is initially collected on said filter means;

(e) scavenging means in said housing generally opposite said inlet means for removing from said first portion of said housing particulate matter separated from the raw air by said filter means; and (f) a plurality of cleaning means associated with each filter assembly for intermittently directing pulses of clean air towards said filter assembly from said second portion of said housing to momentarily dislodge said particulate matter collected thereon, said cleaning means being actuatable so that said pulses are directed sequentially into said filter chambers generally in the direction of air flow from said inlet means to said outlet means whereby said dislodged matter may migrate generally in the direction of said air flow toward said scavenging means.

*3. The method of removing particles of solid matter from air which comprises:*

*(a) supplying a stream of uncleaned air to one end of a filter assembly having flat filter elements defining chambers, with a motion having a generally horizontal component parallel to the surface of the filter elements so that particles are initially collected on said surfaces and the air passes through the filter elements;*

*(b) supplying reverse air pulses to said chambers in a repeating cycle to dislodge the particles briefly from the surface of each adjacent filter element to enable them to migrate therealong with the air stream in a downstream direction toward a scavenge outlet located at the remaining end of the filter assembly; and*

*(c) continuously withdrawing at said scavenge outlet said air carrying the migrated particles.*

*4. A cleaner for removing particlate matter from air comprising, in combination:*

*(a) a housing having first and second spaced opposite ends;*

*(b) at least one filter assembly in said housing extending between said ends, said filter assembly comprising vertically oriented, flat filter members permeable to air but not permeable to particulate material, said filter members having a tapering space defined between adjoining surfaces of said filter members opening toward said second end of said housing; and vertically spaced generally horizontal partitions dividing said space into a plurality of vertically spaced chambers;*

*(c) means mounting said filter assembly in said housing so as to divide said housing into a first portion on one side of said filter assembly and a second portion on an opposite side of said filter assembly;*

*(d) means providing a path for a stream of air through said filter assembly with a motion having a component parallel to the surfaces of said filter members, including:*

*(i) inlet means in said housing at said first end thereof for admitting raw air to said first portion of said housing, and*

*(ii) outlet means at said second end of said housing for enabling egress of clean air from said second portion of said housing, so that particulate airborne matter is initially collected on said filter means;*

*(e) a plurality of cleaning means associated with each filter assembly for intermittently directing pulses of clean air towards said filter assembly from said second portion of said housing sequentially into said chambers to momentarily dislodge said particulate matter collected on said filter elements so that said dislodged matter may migrate generally in the direction of said air flow toward an end of said filter assembly opposite said inlet means; and*

*(f) scavenging means in said housing at said end of said filter assembly for removing particulate matter separated from the raw air.*

* * * * *